J. P. HARRISON, Jr.
POSITIVE AND NEGATIVE TOTAL ADDING MACHINE.
APPLICATION FILED APR. 20, 1916.

1,323,857. Patented Dec. 2, 1919.
7 SHEETS—SHEET 1.

INVENTOR.
John P. Harrison Jr.
BY
ATTORNEYS

J. P. HARRISON, Jr.
POSITIVE AND NEGATIVE TOTAL ADDING MACHINE.
APPLICATION FILED APR. 20, 1916.

1,323,857.

Patented Dec. 2, 1919.
7 SHEETS—SHEET 3.

Inventor
John P. Harrison Jr.
by Alexander
Attorneys

J. P. HARRISON, Jr.
POSITIVE AND NEGATIVE TOTAL ADDING MACHINE.
APPLICATION FILED APR. 20, 1916.

1,323,857.

Patented Dec. 2, 1919.
7 SHEETS—SHEET 5.

Fig. 10.

J. P. HARRISON, Jr.
POSITIVE AND NEGATIVE TOTAL ADDING MACHINE.
APPLICATION FILED APR. 20, 1916.

Patented Dec. 2, 1919.

Fig. 12

UNITED STATES PATENT OFFICE.

JOHN P. HARRISON, JR., OF HAMILTON, OHIO, ASSIGNOR TO THE HARRISON BALANCING MACHINE COMPANY, OF HAMILTON, OHIO, A CORPORATION OF OHIO.

POSITIVE AND NEGATIVE TOTAL ADDING-MACHINE.

1,323,857.   Specification of Letters Patent.   Patented Dec. 2, 1919.

Application filed April 20, 1916. Serial No. 92,423.

*To all whom it may concern:*

Be it known that I, JOHN P. HARRISON, Jr., a citizen of the United States, and a resident of the city of Hamilton, in the county of Butler and State of Ohio, have invented certain new and useful Improvements in Positive and Negative Total Adding-Machines, of which the following is a full, clear, and exact description, reference being had to the accompanying drawings, forming part of this specification.

My invention relates to adding and subtracting machines which indicate either a positive or a negative total. It is understood that to accomplish this purpose, it is not merely necessary to provide a set of dials which may be revolved one way or the other, but it is also necessary to provide for the proper carrying or borrowing of numbers in the two sorts of transactions.

In the type of machine to which my invention is directed, there is no means of clearing the machine so that a set of zeros show on the dials, without subtracting from or adding to the total shown in numerals on the dials. Accordingly it is necessary to provide a means of presenting to the eye of the operator only the set of numerals which he is to work upon, and to provide two sets of numerals, one positive and the other negative. This is true also because of the fact that the wrong set of numerals at most times shows an incorrect total, as will be later explained. Moreover it involves a mental act of selection on the part of the operator to select the proper process of clearing the dials and the machine.

Accordingly it is the object of my invention to provide a means for shifting the carry point in a machine of the character described, to provide a simple and effective means of bringing to the eye of the operator the proper set of numerals on which he is to work, and to provide a totalizer key which will set the machine to the proper position for the operator to print out the total and clear the machine without selecting the proper method of doing so.

The type of machine to which my invention applies more particularly is one where there is a fixed master wheel operative in either direction and a movable carriage having the adding wheels thereon. In such machines, the greatest difficulty is in provid-
ing some means whereby the master wheel is positively locked against overthrow, and accordingly it is one of the objects of my invention to provide a reversible mechanism for actuating the master wheel which has a direct and positive lock to prevent overthrow.

In connection with the master wheel operating device, it is my object also to provide a means for rendering the operating devices inoperative without affecting the operation of the value keys of the machine, so as to operate the printer, without affecting the registering mechanism.

The type of machine to which my invention is particularly applied is one where there are two sets of numerals for exposure to the operator, and to avoid the necessity of two independent sets of carry mechanisms it is a great economy to set the positive and negative dial arrangements at a different initial position when the machine is cleared at the beginning of a transaction. When a shift from positive to negative is made in subtracting from a positive or adding into a negative total, it is necessary to compensate for this error in initial position, and accordingly it is my object to provide a simple and effective means for automatically compensating for this error controlled by the means for concealing the wrong set of numerals.

These objects and various other advantages I accomplish by that certain construction and arrangement of parts to be hereinafter more specifically pointed out and claimed.

This invention is a development from my inventions described in applications in the United States Patent Office, Serial No. 34,827, filed June 18, 1915, on adding machines, and Serial No. 41,042, filed July 21, 1915, on adding and subtracting machines. In the first of these applications, a machine was described having a stationary rotary master wheel, in mesh with counters arranged on a movable carriage and a single set of value keys. The counters meshed with idler pinions and these with a set of numeral dials. The carriage was provided with a step-by-step release to be actuated to allow the carriage to be pulled one space to the left by a suitable spring every time a value key was depressed. A set of keys was provided which controlled the movement of the carriage to the right, these keys being described as order keys and being marked 10, 100, 1000, etc., so as to indicate the number of steps to be accomplished by their depression. A printer was provided operated by the value keys, and mechanism was described for carrying over from one counter to the next, said mechanism re-set by the order keys when positioning the carriage. The carry mechanism was so arranged that the depression of a subtract key would cause it to reversely rotate the dials, said mechanism comprising forks slidable over a shaft and spanning the counters, whereby the movement of the shaft would control whether the upper or lower tine of the forks would contact with the counters for registering a carry.

In my second application above mentioned, I described mechanism for providing a positive and a negative total; that is to say, the machine showed a total below zero as well as above zero. In this machine, as described in said application, the same master wheel was employed, and the same counters. There were two sets of dials, each meshing with the counters and rotating in the same direction, under control of the one set of idlers. In order to indicate what sort of total was in the machine, a shutter was shown, which was adapted to be shifted over to obscure from the operator the set of dials which was not at the time in use. This shutter was operated from the last counter wheel in the two series, so that at the time when this dial would be in carry position, the shutter would be shifted.

In the machine of said latter application, the dials were set at initial position so that the positive dials showed all zeros and the negative dials showed all nines except the units dial which showed zero. This was for the reason that the negative dials move in the same direction as the positive dials under control of a common operating means, and the numerals were reversely placed. If 25 were added into the machine as explained in said application when the negative dials were at zero, then the result would be 85, i. e. a reverse movement of two points in the tens dial and 5 in the units dial. Then if 47 were subtracted so as to bring the total to the negative side, the result would be 132, resulting from a forward movement of the tens negative dial from 8 to 4 carrying 1 to the hundreds dial, and from 6 to 2 in the units dial carrying 1 to the tens dial, said transaction giving a result of 132, which is incorrect. If the negative dials were all at 9 except the units dial it can be seen that the carry from the tens to the hundreds dial above noted, would bring all the negative dials to zero from 100 up, and the tens dial being originally at 9 instead of 0 would be at 2 at the end of the above transaction instead of 3, resulting in 22 which is the correct result of 25 minus 47.

In said machine also, there was means provided for shifting the carry point for the units position, which was at zero to begin with, for the reasons explained in the introductory matter to this specification, and means were also provided for adding 10 into the machine upon shifting the shutter, for compensating for the difference in the positions of the two sets of dials, the tens carry being to correct the series of 9's and the units carry shift to correct for positive and negative.

Now it is not the purpose in this specification to describe the printing or carrying mechanism described in the two former applications, nor is it the intention to describe the order keys and the step-by-step release of the carriage, it being understood that the mechanism described in my former application is the preferred form, but that any form of such devices could as well be employed herein. Wherever any member included in the operating devices for the printer or ordering means is mentioned, this will be described and shown in the drawings. It is my purpose to confine this application to the following points. I will describe a positive and negative dial system whereby both sets of numerals are arranged on a single set of dials, thereby doing away with the double set of the second application above noted. In this connection, I will describe mechanism for mounting these dials on a rocker which will swing to bring the proper set into view, this mechanism serving to add ten into the machine when necessary, similar to the shutter in said former application. I will describe mechanism for reversely actuating the master wheel, said mechanism being in the form of a balanced lever as in my former application, working up at either end for purposes of actuation, and a positive lock in connection therewith. This mechanism I will also describe with a cut-out to prevent actuation when desirable to print only.

I will describe a key and mechanism for setting the machine so that the operator to print a total has but to depress the value keys in order as the numbers of the total appear, after once depressing the total key. Also I will describe a graduated means of operation between the value keys and the master wheel device which results in a considerable saving in expense over the means described in my first above mentioned application.

The carriage has side pieces 1 and 2 within which various shafts are mounted as will be described. In this carriage are mounted the counters, the carry mechanism and the various locks therefor. On the left hand frame of the machine are mounted the master wheel operator, the subtract shift key and parts, the total key and parts, the non-add key and parts, and the locks for these members.

*The duplex dials and shift therefor.*

Figures 1, 2:
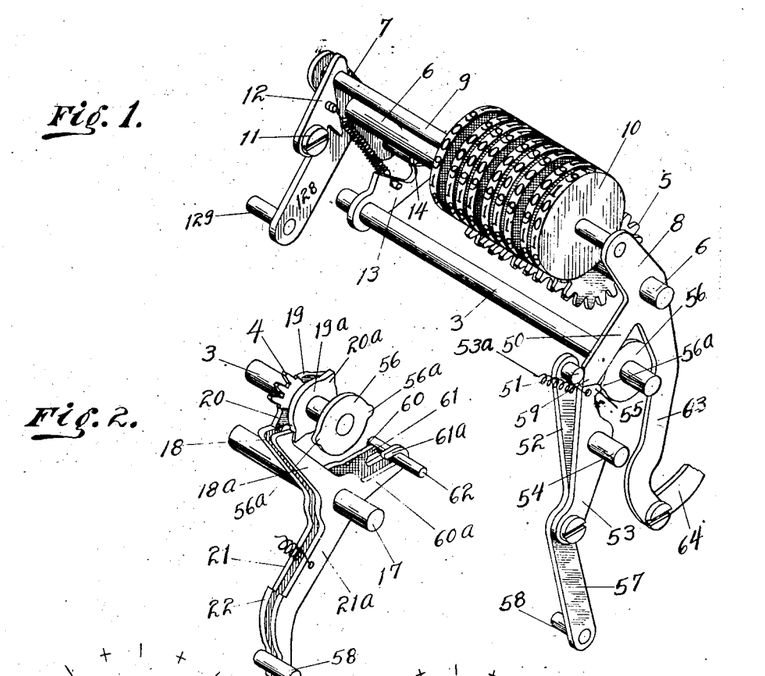
Figure 1 is a detail perspective of the numeral dials and the mounting thereof.
Fig. 2 is a like view of carry mechanism 95 at the right end of the counter pinion shaft.
Figure 8:
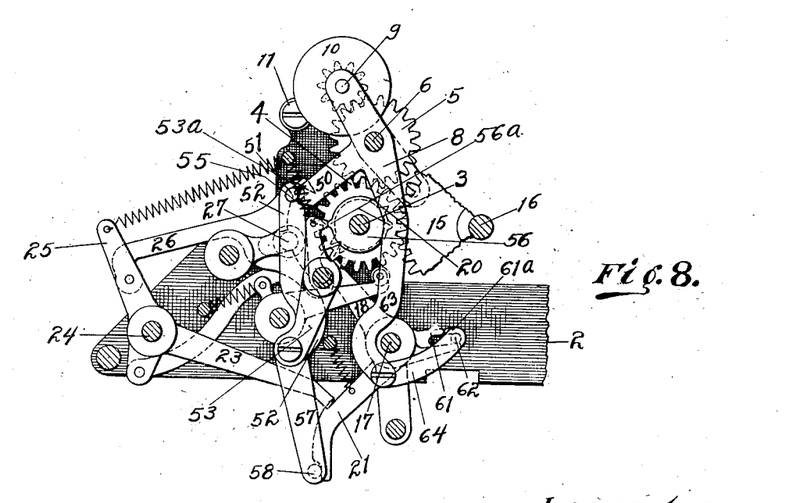
Fig. 8 is a left side elevation of the forward end of the carriage.

Mounted on a shaft 3 which is fixed in the carriage are a set of counter pinions, or sprockets 4, each having twenty teeth. These pinions mesh with a set of idler pinions 5 mounted on a shaft 6. A rocker member having at the left a T-shaped bar 7, and at the right a special shaped bar 8, has apertures for mounting the shaft 9 which carries the numeral dials 10 (Figs. 1 and 8). Mounted on a stud 11 at the left side of the carriage is a spring latch 12, which engages and locks with the shaft 9 of the dials so as to hold this shaft in proper position to expose the positive dials. Mounted on the counter shaft 3 is a like latch 13 which engages a pin 14 at the other end of the head of the T-shaped rocker member.

Figure 3:
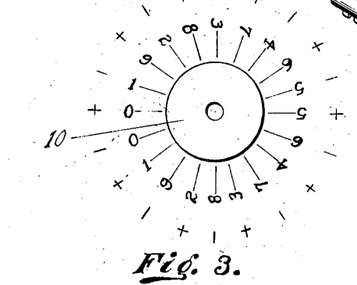
Fig. 3 is a diagrammatic view of the numeral dial for the units place.

The dials 10 are in this instance nine in number, and they have on their faces two series of numerals, one for positive totals and one for negative totals. The master wheel 15 revolves on its shaft 16 (Fig. 8) in a counter-clockwise motion for addition and clockwise for subtraction, resulting in a clockwise motion of the dials during addition and counter-clockwise during subtraction. The two sets of numerals on the dials are arranged therefore, so that there will be a forward progression of positive numerals during addition and a forward movement of the negative numerals during subtraction. As shown in Fig. 3, the numerals of the positive set, indicated by a plus mark, progress counter clockwise, and the negative set progress clockwise.

Figure 4:
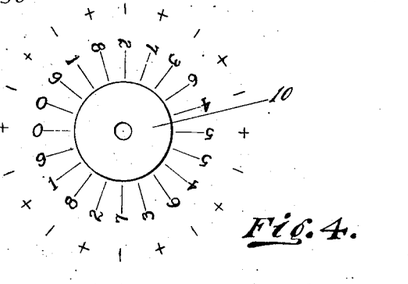
Fig. 4 is a like view of the balance of the dials. 100
Figure 5:
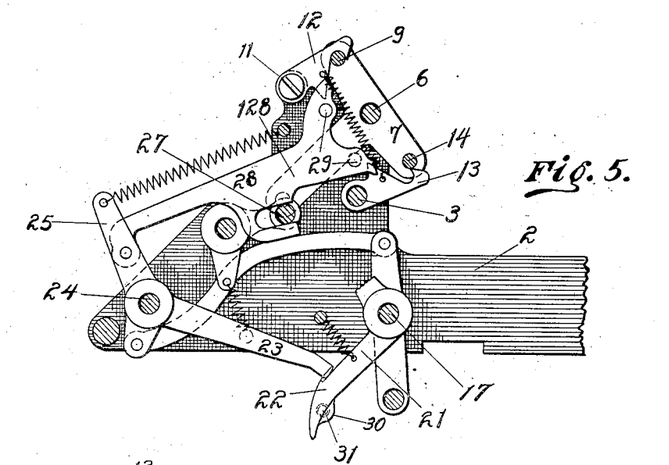
Fig. 5 is a side elevation of the dial shift device in neutral position and with the dial rocker held in position for a positive total.
Figure 6:
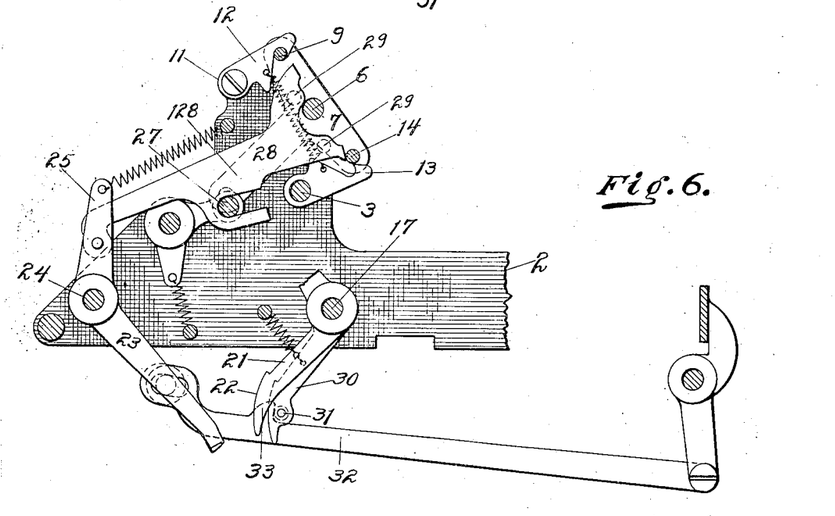
Fig. 6 is a like view showing the parts in the act of setting the dials for a positive total.
Figure 7:
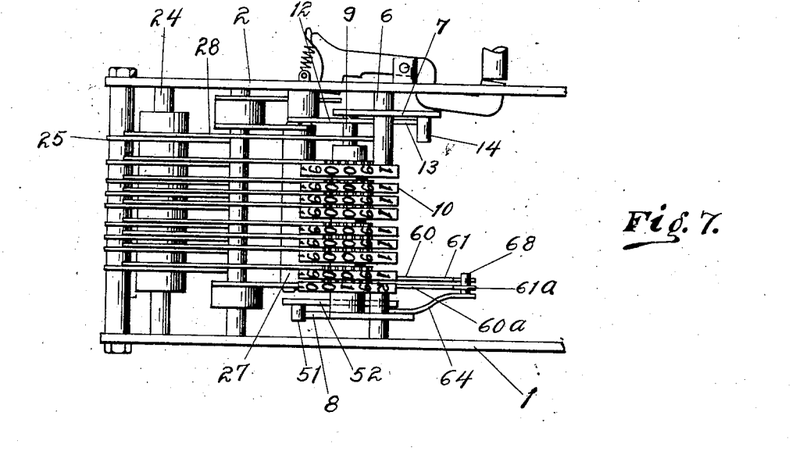
Fig. 7 is a top plan view of the forward end of the carriage.

The movement of the dials on the rocker device above described is accomplished in a manner to swing the dials forward so as to show through any desired slot in the machine casing, during positive transactions, and to swing them rearwardly during negative transactions. Hence it results that the numerals of positive nature are set so as to precede the negative numerals if the dials are considered as turning clockwise, and accordingly in Fig. 3, which represents the units dial, a shift rearwardly which would reveal a zero, would still show a zero if shifted forwardly, whereas in Fig. 4, the rearward shift from a showing of zero in the positive set of numerals would show 9 on the negative set.

Thus considering the numerals themselves as dis-associated from the dials, the negative numbers at initial position read 999999990 and the positive set read 000000000, where nine dials are employed.

By employing but one set of dials, I save the expense of two sets as in my former application, and by employing but one set of counters, I avoid the necessity of two sets of carry mechanisms. To accomplish the latter saving, it is necessary to arrange the numerals on all the dials except the units, at a position varying one point from the one set compared to the other, and in this connection to provide means for shifting the dials to their correct position in passing from a transaction at one side of zero to one on the other. It is also necessary to compensate for the variation of the carry point between positive and negative where the numerals are both at zero, to wit: in the units position.

The carry bell cranks employed between the various dials are not shown in the drawings, only the units carry bell crank being shown. These bell cranks, however, differ from the others only in the carry shift mechanism, and accordingly it will be understood that these bell cranks are all mounted on a shaft 17 (Figs. 2, 5, 6 and 8), and comprise hooked members 18, springheld in contact with disks 19 to the right of each counter. Two teeth 20 on the disks spaced ten points apart serve to swing out the hooked members. The other ends 21 of the bell cranks have hooks 22 which retain the arms 23 of another set of bell cranks mounted on a shaft 24. These levers have arms 25, which are springpulled toward the counters, and carry forks 26. The forks are slidably mounted on a shiftable shaft 27 which serves to regulate whether the upper or lower tine of the forks comes into contact with the counter pinion adjacent the disks 19 on the pinions next to the right. If the upper tine comes into operation, the rearward swing of the carry bell crank hooks 22 will allow the forks to move the counters one space clockwise, thereby adding 1 as a carry. If, however, the lower tine will contact with the counter, then there will be a subtraction of 1.

By means of a mechanism not described in this application, the subtract key upon depression causes a raising of the shaft 27 to bring the lower tine of the forks into play, and the shaft is then adapted to be lowered into neutral at the end of the carriage movement after the subtract operation, if the subtract key is not locked down. The depression of an order key will then set the shaft in its lower position for addition. These mechanisms are described in my first above mentioned application.

It will be obvious that the terminal counter pinion at the left does not need to carry over, but does need to accomplish the shift of the rocker to vary the position of the dial system. Accordingly a carry bell crank is provided for this end pinion as well as a disk 19. Supposing a subtraction is to be made into the machine to register a negative number where there is a positive number in the machine as in Figs. 5 and 6. The shaft 27 will be raised to accomplish the subtraction, and the carry fork for the terminal pinion will be likewise raised. The fork 28 for the terminal bell crank is of broader form than the balance of the forks, and has mounted on its tines, the pins 29, 29, to throw out the latches 12 and 13, in this instance the latch 12. The accomplishing of the above supposed transaction will affect the terminal counter pinion as if for a carry, and the bell crank will be released which will allow the fork 28 to move rearwardly. The fork in this movement will first strike off the latch 12, and then contact with the shaft 9 of the numeral dials and thereby accomplish a rearward swinging of the dials, to expose the negative total.

To prevent the shift of the dial until such transaction is completely entered, there are two hooked members for the bell crank carrying the fork 28, the hooked arm 30, mounted alongside of the usual arm 21, serving to hold up the said fork carrying member, until a pin 31 on this hooked member 30 comes into contact with a reciprocating bar 32 at the left of the machine. This bar, being attached to the carriage release, is arranged to operate, as described in my second former application, only when the units dial is being acted upon, and this bar carries a nose 33 for contact with the said pin 31.

It will be understood that the operation of shifting over the dial bearing rocker device is reversed when the dials are rearward in negative position and the dial is to be shifted to the positive side, by a forward movement.

*The compensating devices.*

The theory of operation of the compensating device is the same as in my second former application, and is only altered in this device so as to allow for the rocker instead of the shutter in the former application. The structure is also simplified because of the fact that the rocker itself can be employed at the right of the carriage instead of cross shafts and levers as in my former application.

It will be recalled that to compensate for the variance of one point between zero and 9 of the positive and negative numerals, a means is to be provided for adding one to the tens counter so that all of the nines will be cleared to give a proper negative result, and subtracting this amount to put the positive numerals back in proper position when again shifting the dial system.

Extending forwardly from the rocker bar 8 is the arm 50 which is part of the bar (Fig. 1). This bar is arranged to contact with a pin 51 on an arm 52, which is pivoted to a supporting lever 53. The lever 53 is mounted on a pin 54 on the right side of the carriage, and is held with its nose 55 in line with the disk 56 that revolves with the units counter. The arm 52 extends beyond its pivot point to the lever 53, at 57, and at the end of this extension 57 is a pin 58 which lies against the double carry levers for the units carry, which will be described later. The lever 53 is held in position by a spring 53ª which holds the pins 58 loosely against the tens carry levers 21, and thus the arm 52 and the lever 53 in the position shown in Fig. 1.

The end 59 of the arm 50 on the rocker member 8 is pointed where it contacts with the pin 51 on the arm 52, so that when the rocker is swung as before described, the end will move the arm 52 a certain distance and then release it, whereupon the arm 52 will fall in behind the said rocker member and remain in its new position until a further shift. The disk 56 above mentioned has two noses 56ª which are placed to correspond with zero for the units counter pinion. When the nose contacts with the end of the supporting lever 53 for the arm 52, then the movement of the rocker member will swing the pin 58 far enough to strike over the carry levers, so as to bring about a carry in the tens counter. If, however, the nose is not in contact with said supporting lever 53, then the moving of the rocker device will not cause a carry by the said pin 58, releasing the carry mechanism.

By these means, therefore, the actuation of the rocker device which occurs whenever the total on the dials shifts from one side of the other, will cause an addition of zero to the other, will cause an addition of ten to the machine provided the units dial is at zero, but not otherwise.

The reason for this, as fully explained in my former application, is that there is a carry shift provided which takes care of the original misplacement of the numerals when the units dial passes from zero to nine, this shift so operating that it adds in the necessary ten.

In addition to the carry bell cranks 18, 21, of the balance of the machine, there is another bell crank for the units counter. This bell crank has a hooked arm 18ª and a hooked extension 21ª. The arm 18ª contacts with a disk 19ª connected to the units counter, the teeth 20ª on this disk being set one space behind the teeth 20 of the corresponding disk, for a clockwise rotation.

It is necessary that both bell cranks be swung with their extended ends releasing the end of the fork carrying lever, and accordingly means are provided, operated from the rocker mechanism to properly control this joint motion.

Extending rearwardly from the two bell cranks are arms 60 and 60ª for the two levers respectively. The extension 60 for the normal lever has a hook 61 opening rearwardly and the extension 60ª has a hook 61ª opening forwardly. A pin 62 slides back and forth between these two hooks, and it is obvious that if the pin lies within either of the hooks, that the raising of the unhooked lever will move the one that is so held by the pin. The raising of the lever that is hooked over the pin will not, however, affect the other one. Therefore during positive operation, the pin should engage the rearward hook and during negative operation the pin should engage the forward hook.

This mechanism comprises a long arm 63 extending from the rocker member 8, which arm carries a pivoted link 64 that has the said pin 62 at its end. Thus when the dials are forwardly placed for positive reading the pin will be in the rearward hook, and vice versa.

*The master wheel operating devices.*

In the first of my two former applications I describe as above stated a balanced lever, bearing pawls on each end. This lever was tipped up at either end by means of value keys which had a series of graded abutments which were arranged to strike on a transverse bail, said bail being connected to a rock shaft, which had an arm connected to the center of the lever. Thus the free end of the lever was raised by depression of the value keys and in so doing operated on one side or the other of a pinion on the master wheel shaft, through the agency of the pawls.

In said device, it was necessary to supply ten different forms of value key abutments, thus multiplying the parts of the mechanism. In this device, however, there are provided value key levers 70, which are pivoted on the shaft 71. This shaft is a rock shaft and has on it an arm 72 which is connected to the center of a balanced lever 73, by a pivot 74. Fixed non-rotatably on the rock shaft is a transverse bail 75 which lies beneath a series of plates 76. The plates 76 are mounted on a shaft 77 which runs across the front of the machine, and said plates have extensions 78, which lie over the bail. The value key levers 70 have studs 79 placed on the sides thereof, and engaged slidably by slots 80 formed in the extensions 78 of the bail operating plates.

When a value key is depressed the extensions on the plates are also depressed a distance dependent upon the position of the stud 79 on the value key lever. The depression of the plate causes a like depression of the bail beneath it, which said bail raises the center of the balanced lever, causing an operation of the master wheel as will be described. The value key levers may be made all according to one pattern, thus enabling all the levers to be stamped with a single die. The levers may be provided with each ten holes 81 to receive the studs, so that in setting up the machine all that the assembler need do is to place the studs in the proper place for each value denoted on the key.

Figure 10:
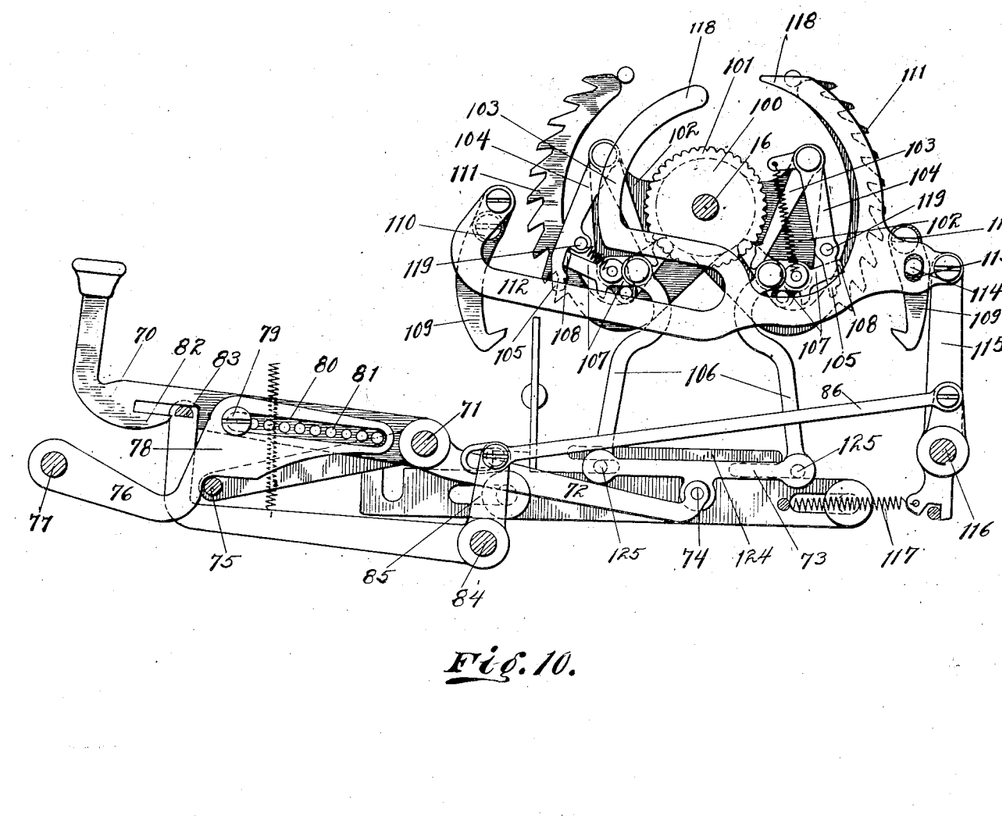
Fig. 10 is a side elevation of the master key operating device, showing the positive lock, and showing the parts in position for adding into the machine, together with one of the number or value keys.
Figure 11:
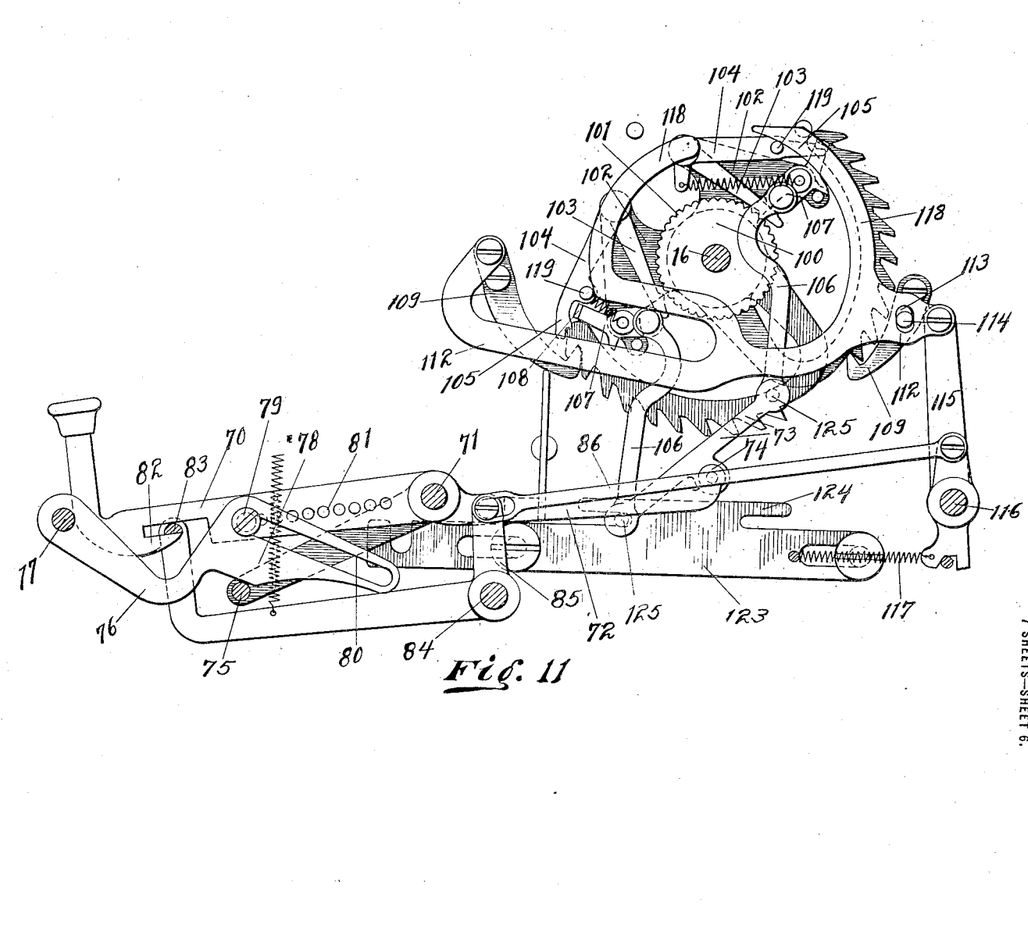
Fig. 11 is a like view to Fig. 10, with the value key in depressed position.

On the under side of each key lever is formed a hook 82 which engages over a transverse bail 83. This bail once depressed, will swing into the path of descent of the other levers, thereby preventing a duplicate registration, and also this bail rocks a shaft 84 on which it is mounted. This shaft has an arm 85 thereon which engages the slotted end of a long arm 86. This arm is connected to the carriage escapement shaft 116 and thence to the master wheel operator lock and serves to operate the lock, as will be described after a full depression of any key, coming into operation because of the slot, just after the registration has been completed. The value key lever shown in Figs. 10 and 11 is that of the numeral nine, and it will be understood that the graduated position of the studs will vary from this position toward the rear end of the slot.

Pivoted around the master wheel shaft 16 are two plates 100, which carry the master wheel operating pawls. These two plates are mounted one in front of the other, and behind the pinion 101 on the master wheel shaft, which said pinion has its teeth cut with flat faces to insure proper registration. The plates 100 have extensions 102 which carry at their upper end, the loosely pivoted pawls 103. Also at the pivot point of the pawls are spring-pulled levers 104, which have notched ends 105.

Mounted on each end of the balanced lever, are arms 106 pivoted at their upper ends to levers 107, the latter being pivoted at the base of the extensions 102 of the plates 100. These levers 107 have their ends engaged by the levers 104. Adjacent the upper pivot point of the arms on the balanced lever, the levers 107 lie underneath the end of the pawls 103, and the raising of either of said arms will result in the pushing of the pawl for said arm into mesh with the pinion 101 on the master wheel shaft. This movement will also result in the lever 107 being depressed at its outer end which will result in the notched end of the lever 104 catching the bent end 108 of said lever 107 and holding it in depressed position. The holding down of this lever 107 will result in the holding of the arm on the balanced lever in position to retain the pawl in mesh with the pinion as above stated, and then the continued movement of the balanced lever will result in the entire plate 100 with the pawl and latches attached thereto being swung around the master wheel shaft, causing the rotation of the pinion and a like rotation of the master wheel.

The locking device or overthrow preventer comprises two pawls 109 pivoted on studs 110 in the left side of the machine, and notched curved arms 111 which extend across beneath the master wheel shaft from the plates 100 which mount the actuating pawls 103. The pawls 109 are swung into mesh with the teeth of these curved arms by means of the pulling over of a frame operated by the reciprocating arm 86, which it will be remembered was to be operated by the value keys at the end of their operation, and operated the escapement. This frame, indicated at 112, has a slot 113 at the rear end which engages a pin 114 on the rear pawl 109, and at the forward end of the frame it is pivoted to the end of the pawl 109 at said end, which said pawl is pivoted to its stud 110 below the pivot with the said frame. The plate at its rear end is pivoted to a lever 115 which is itself fixed on the escapement shaft 116, which is springheld at 117 below said shaft. When a value key is fully depressed, the frame will be swung forwardly together with the escapement shaft, resulting in each of the pawls 109 being swung into mesh with the toothed curved arms of the operating device now described. This will positively stop all overthrow of the operating device and thus give accuracy to the machine without acting direct on the master wheel itself. In my former machine, there was an overthrow preventer which engaged the master wheel, but such a device is quite difficult to adjust with sufficient nicety to come into play at the proper time, because it must be very positive in its action or else an overthrow of the operator of the master wheel would result in carrying said master wheel by the proper position for a correct registration.

Extending up from the movable frame 112 are two curved arms 118, which serve to release the arms on the balanced lever from the locked position in which they are placed at the beginning of the operation. It will be noted that the construction of the forward and the rearward of the two bell cranks 104 which accomplish this locking is slightly different. Thus the bell crank at the forward side of the master wheel shaft has its locking notch at the rear side of it while the opposite is true of the one to the rear of said shaft. The forward arm must thus be swung forwardly of the machine to release the balanced lever, and the rearward arm must be swung forwardly also. The curved arms 118 are so positioned that when the frame is reciprocated, the said arms will come in contact with pins 119 on the levers 104, thereby swinging them out of locking position. Because of the fact that said arms are curved, they will come into operation at any position of the master wheel operator, said curve having its center in the master wheel shaft.

The rearward pawl and operating device is for addition and the forward one for subtraction, and devices will be next described which control which end of the balanced lever will be swung up upon depression of the value keys. This device operates in the same manner as described in my second former application.

Figure 9:
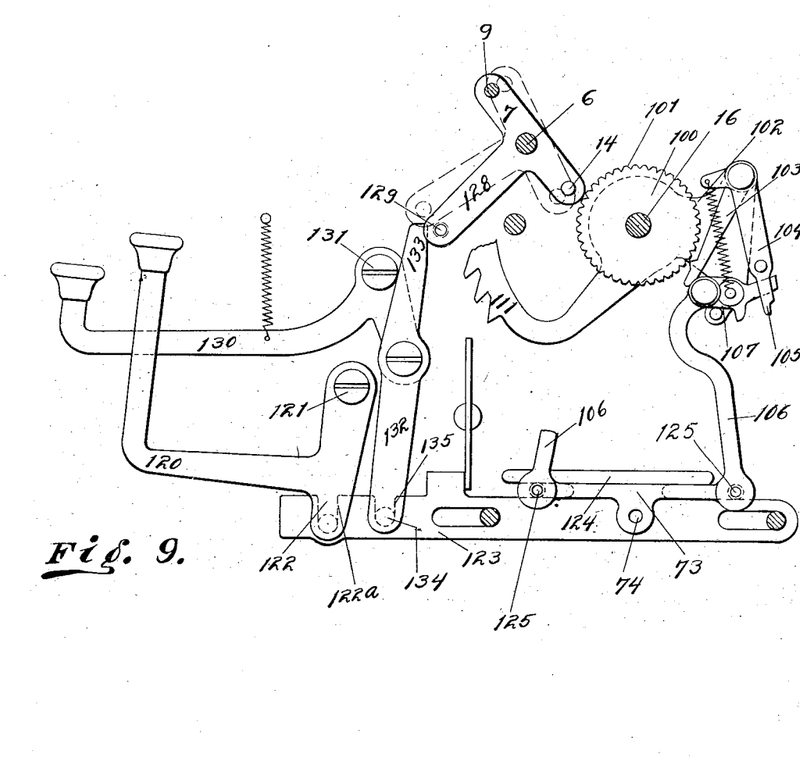
Fig. 9 is a side elevation of the key to print total, and its connection at the right side of the machine.
Figure 12:
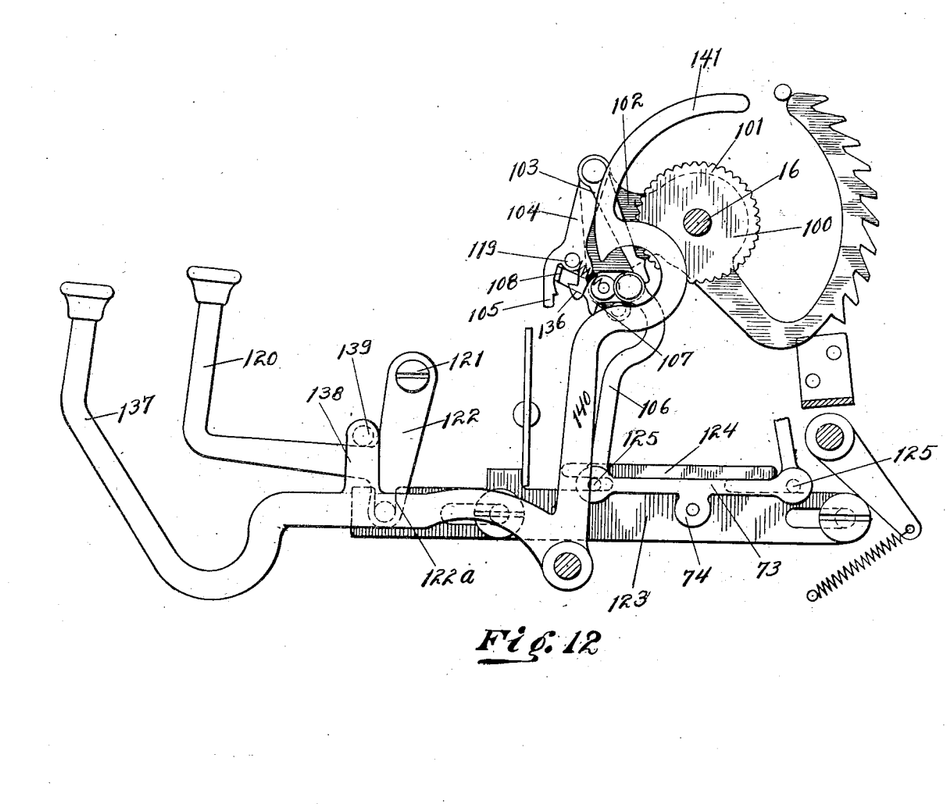
Fig. 12 is a like view to Figs. 10 and 11, showing the non-add key rendering the master wheel operating devices inoperative, said devices being shown in part only.

As shown in Figs. 9 and 12, the subtract key lever 120 is pivoted at 121 to the left side of the machine. It has a depending portion 122, which bears a pin that lies in a slot 122ª in a sliding bar 123. This bar normally spring-pressed forwardly, has a T-shaped plate 124 upon its upper side which lies over pins 125 on the two ends of the balanced lever. When the subtract key is depressed, this bar is reciprocated so as to bring the rearward end of the T over the pin on the add side of the balanced lever, resulting in the subtract end being brought into play. Normally the T engages the subtract side of the lever so that unless the subtract key is depressed, the machine will always add.

The totalizer key and parts.

It will be remembered that the number dials were shifted when a negative total or a positive total was to show in the machine. This shifting is accomplished by the rocking of a rocker arm 7. This rocker arm is provided with an extended arm 128 which has a pin 129 at its end.

The total key lever 130 is pivoted at 131 to the casing of the machine, and has an arm 132 pivoted to its end beyond said pivot 131. This arm 132 also extends upwardly at 133 to a position beneath the pin 129 on the T-shaped rocker piece arm 128. When the said piece is in negative total position as shown in dotted lines in Fig. 9, the depression of the total key will result in the end 133 of the arm being freed to move and hence the lower end of the arm having no effect on the reciprocating bar that controls the action of the balanced lever. When, however, the T-shaped rocker piece is in positive total position as shown in full lines in said figure, then the upper end of the lever will contact with the pin 129 and the lower end of the arm will actuate the reciprocating bar by the medium of the pin 134 on the arm and the slot 135 in the bar, similar to the subtract key actuation.

Thus when the adding mechanism shows a positive total and the total key is depressed, the master wheel operator will be shifted so as to subtract. The operator in making a total will depress the total key and then print out the numerals shown on the positive dials, which will be exposed at such time. This will cause a printing of the total and at the same time will return all the dials to zero, because there will be a subtraction. If, however, there is a negative total and the total key is depressed, the machine will add, because there will be no shift of the reciprocating bar out of its normal add position.

The non-add or print key and parts.

It will be remembered that in describing the master wheel operator, it was mentioned that the devices on both sides of the master wheel pinion were substantially the same. Now for the non-add device, it is my purpose to alter the substract side of the master wheel operator and provide for this device a neutralizing means which will depress the substract key so as to free only the subtract end of the balanced lever for operation and will render this altered operating device inoperative. At all other times this device will operate the same as the add side of the master wheel operator as will be evident by referring back to the description thereof. The only difference of the two in the description thereof was that the substract latch lever worked forwardly to release and rearwardly to lock, whereas the add latch lever worked in the opposite direction.

The alteration consists in providing an extra hook on the latch lever of the subtract side of the operator. This hook 136 will operate to engage the bent end 108 of the lever 107 which it will be remembered was pivoted to the upwardly extending arm on the end of the balanced lever, provided the lever 104 is swung forwardly. The retaining of the arm 107 in the position of engagement with the hook 136 will prevent the arm on the balanced lever swinging into contact with the operating pawl 103 and prevent a registration.

This is accomplished by means of a key lever 137 which is mounted on any suitable shaft, and has an upwardly extending arm 138 that bears a pin 139 for contacting with and depressing the subtract key lever. Coupled to the key lever 137 is another upwardly extending member 140 which terminates in a curved end 141. As the lever is operated the subtract key is thus depressed and the curved end 141 contacts with the pin 119 on the latch lever 104 causing it to swing forwardly, which engages and locks the arm on the balanced lever so that it cannot bring the operating pawl into mesh with the master wheel shaft pinion. The balanced lever can be operated, but so long as the non-add key is depressed the curved end of the key lever extension will remain in contact with the latch lever pin and prevent any registration.

It is not believed necessary to further describe the operation of the machine as a whole, as the various operations have been dealt with during the description of the various parts under their separate headings. The general theory of operation of the positive and negative total device is the same as in my second former application, and the idea of the master wheel and the carriage is the same as in my first former application. Except for purposes of bringing the numeral dials higher up in the machine casing the set of idler pinions intermediate them and the counter pinions is not necessary. The purpose generally of avoiding the multiplication of parts has been applied in this case, to cut out considerable of the finer adjustments in the value key mechanism of the former cases.

I do not wish to be limited in the claims that follow to specific mechanism because of the failure to point out during the above description the equivalent structures which could be substituted without departing from the spirit of my invention. On the contrary, I wish the full application of the doctrine of equivalents to be applied to the construction of my claims wherever their wording permits. Also I do not wish to be limited to the exact use of the various mechanisms described in any one type of adding machine, but on the contrary desire that my various improvements be employed in the art in any manner that may turn out to be economical and convenient, and that the minor changes necessary to accommodate the parts to new uses be fully included within the scope of my invention as expressed in the claims.

Having thus described my invention, what I claim as new and desire to secure by Letters Patent, is:—

1. In a device of the character described, the combination with counter elements, of a single set of dials in constant mesh therewith, said dials having sets of numerals thereon for both negative and positive transactions, a rocker member upon which said dials are mounted, and means controlled by the terminal counter element for causing said member to rock to change the position of said dials, for the purpose described.

2. In a device of the character described, the combination with counter elements, of a single set of dials in constant mesh therewith, said dials having sets of numerals thereon for both negative and positive transactions, a rocker member upon which said dials are mounted, and means controlled by the terminal counter element for causing said member to change the position of said dials, the numerals on said dials arranged in reverse order, ten digits apart, and means on the rocker member for setting into operation a compensating device to correct the digits error in the position of the dials.

3. In an adding machine, the combination with a master wheel having a shaft and a set of counters to be actuated thereby, a balanced lever, means on either side of the center thereof radially movable around the master wheel shaft, and carrying elements for revolving said shaft, and means for locking the carrying elements in operative position with relation to said shaft.

4. In an adding machine, a movable element for actuating the adding parts, a set of key levers of uniform shape, a slotted member for actuating the movable element, and studs for the key levers engaging the slotted member, said studs located in graduated positions, for the purpose described.

5. In a machine for providing a positive and negative total, a reversible operating device for adding or subtracting, a member adapted to shift automatically when the machine passes zero in either direction, a total key, means for normally retaining the operating device in position for adding, and means controlled by the automatically shiftable member and coupled to the total key for shifting the retaining means to subtract position, when the total is positive, said means being operative when the shiftable member is in its negative position.

6. In an adding machine, a shaft adapted to be rotated to actuate the adding parts, a member rotatable around said shaft, a pawl upon said member to operate the shaft, a latch upon said member, an arm connected to said latch and adapted to throw the same into latched position, said latch adapted to throw the pawl into operative position, a print key lever, and means thereon for holding the latch out of locked position.

7. In an adding machine, a shaft adapted to be rotated to actuate the adding parts, a member rotatable around said shaft, a pawl upon said member to operate the shaft, a latch upon said member, an arm connected to said latch and adapted to throw the same into latched position, said latch adapted to throw the pawl into operative position, a notched member connected to said rotatable member, means for engaging therewith to prevent overthrow, and means operated by said engaging means to release said latches.

8. In a machine for providing a positive and negative total, elements for displaying the positive or negative results of a transaction, a reversible counter system for actuating said elements and a total key, an automatic means coupled to said key for controlling the direction of operation of the counter system, whereby upon depression of said key the printing out of the result on said elements will clear said elements for another transaction whether said total be positive or negative.

9. In a positive and negative calculating machine of the type wherein the result of a transaction must be printed out by the operator to show a total and to clear the machine, numeral displaying elements, a total key, and automatic means controlled by said key to cause a movement of the said elements upon the operation thereof toward cleared position.

10. In an adding machine, a movable element for actuating the adding parts, a set of key levers of uniform shape, studs for the key levers arranged in graduated position along the levers, and members for controlling the movable element, of uniform shape and lying beneath the studs, for the purpose described.

11. In an adding and subtracting machine, a registering member and an operating device therefor, means for forwardly operating said device for adding and for reversely operating same for subtracting, a non-add key, and means controlled by said key for locking the means for forwardly operating the device, and holding out of operation the means for reversely operating the device.

12. In an adding and subtracting machine, a registering member and an operating device therefor, means for forwardly operating said device for adding and for reversely operating same for subtracting, a non-add key, and means controlled by said key for locking one of said operating means, and for permitting operation of the other, but holding said other out of operative relation with said operating device.

JOHN P. HARRISON, Jr.